(12) United States Patent
Bastos et al.

(10) Patent No.: US 6,704,025 B1
(45) Date of Patent: Mar. 9, 2004

(54) SYSTEM AND METHOD FOR DUAL-DEPTH SHADOW-MAPPING

(75) Inventors: Rui M. Bastos, Santa Clara, CA (US); Cass W. Everitt, Pflugerville, TX (US); Mark J. Kilgard, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 194 days.

(21) Appl. No.: 09/944,990

(22) Filed: Aug. 31, 2001

(51) Int. Cl.[7] .................................................. G09G 5/02
(52) U.S. Cl. ........................ 345/589; 345/582; 345/591; 345/593; 345/426
(58) Field of Search ................................ 345/582, 589, 345/591, 593, 426

(56) References Cited

U.S. PATENT DOCUMENTS

| | | | |
|---|---|---|---|
| 4,996,666 A | 2/1991 | Duluk, Jr. ..................... | 365/49 |
| 5,535,288 A | 7/1996 | Chen et al. .................. | 382/236 |
| 5,572,634 A | 11/1996 | Duluk, Jr. .................... | 395/119 |
| 5,574,835 A | 11/1996 | Duluk, Jr. et al. ........... | 395/121 |
| 5,596,686 A | 1/1997 | Duluk, Jr. et al. ........... | 395/122 |
| 5,669,010 A | 9/1997 | Duluk, Jr. ............... | 395/800.22 |
| 5,977,987 A | 11/1999 | Duluk, Jr. .................... | 345/441 |
| 6,229,553 B1 | 5/2001 | Duluk, Jr. et al. .......... | 345/506 |
| 6,252,608 B1 * | 6/2001 | Snyder et al. ............... | 345/473 |
| 6,268,875 B1 | 7/2001 | Duluk, Jr. et al. .......... | 345/506 |
| 6,285,378 B1 | 9/2001 | Duluk, Jr. .................... | 345/441 |
| 6,288,730 B1 | 9/2001 | Duluk, Jr. et al. .......... | 345/552 |

FOREIGN PATENT DOCUMENTS

| | | | |
|---|---|---|---|
| WO | 93/23816 | 11/1993 | ......... G06F/15/334 |
| WO | 97/05575 | 2/1997 | ........... G06T/15/00 |
| WO | 97/05576 | 2/1997 | ........... G06T/15/00 |
| WO | 00/10372 | 3/2000 | |
| WO | 00/11562 | 3/2000 | ........... G06F/15/00 |
| WO | 00/11602 | 3/2000 | |
| WO | 00/11603 | 3/2000 | |
| WO | 00/11604 | 3/2000 | |
| WO | 00/11605 | 3/2000 | |
| WO | 00/11607 | 3/2000 | ............. G06T/1/20 |
| WO | 00/11613 | 3/2000 | ........... G06T/15/00 |
| WO | 00/11614 | 3/2000 | ........... G06T/17/00 |
| WO | 00/19377 | 4/2000 | ........... G06T/15/00 |

OTHER PUBLICATIONS

Segal et al, The Open GL® Graphics System: A Specification (Version 1.3), Aug. 14, 2001, Mountain View, CA.

* cited by examiner

*Primary Examiner*—Matthew C. Bella
*Assistant Examiner*—Tam Tran
(74) *Attorney, Agent, or Firm*—Silicon Valley IP Group, PC; Kevin J. Zilka

(57) ABSTRACT

A system and method are provided for improved shadow mapping in a graphics pipeline. Raw depth values are initially collected from two depth layers in a scene to be rendered. Shadow-map depth values are then calculated utilizing the raw depth values. The scene is then shadow mapped utilizing the shadow-map depth values in order to improve the appearance of shadows in a rendered scene. The various steps are carried out by a hardware-implemented graphics pipeline, which may include texturing or shadowing mapping hardware.

22 Claims, 11 Drawing Sheets

SYSTEM AND METHOD FOR DUAL-DEPTH SHADOW-MAPPING

RELATED APPLICATION(S)

The present application is related to co-pending applications entitled "ORDER-INDEPENDENT TRANSPARENCY RENDERING SYSTEM AND METHOD" filed concurrently herewith under application Ser. No. 09/944,988 and naming the same inventors as the present application, and "SYSTEM AND METHOD FOR USING AND COLLECTING INFORMATION FROM A PLURALITY OF DEPTH LAYERS" filed concurrently herewith under application Ser. No. 09/945,444 and naming the same inventors as the present application, which are each incorporated herein by reference in their entirety.

FIELD OF THE INVENTION

The present invention relates to computer graphics, and more particularly to shadow mapping in a graphics pipeline.

BACKGROUND OF THE INVENTION

A major objective in graphics rendering is to produce images that are so realistic that the observer believes the image is real. A fundamental difficulty in achieving total visual realism is the complexity of accurately representing real world visual effects. A scene can include a wide variety of textures, subtle color gradations, reflections, translucency, etc.

One important way to make images more realistic is to determine how objects in a scene cast shadows and then represent these shadows in the rendered image. Shadows enhance the realism of an image because they give a two-dimensional image a three-dimensional feel.

The addition of shadows to the rendering of a complex model can greatly enhance the understanding of that model's geometry. The human visual system uses shadows as a cue for depth and shape. Consequently, shadows are very useful for conveying the three-dimensional nature of rendered objects and for adding realism to computer generated scenes.

Prior Art FIG. 1 illustrates a scene to be rendered to include shadows. As shown in Prior Art FIG. 1, a particular scene 100 includes a light source 104, an object 102, and a surface 106. Due to the relative orientation of the light source 104, object 102, and surface 106, a shadow should be shown on the surface 106 where the object 102 obstructs light from the light source 104. Shadow mapping is a technique by which a graphics pipeline may determine which portions of the surface 106 should be rendered with a shadow.

Prior Art FIG. 2 illustrates a prior art technique 200 of shadow mapping. As shown, a light depth value ($Z_{light}$) is collected for every portion of the surface 106 that is to be rendered. Such light depth value ($Z_{light}$) represents a distance between the light source 104 and the object 102 which may (or may not) be obstructing the light source 104 at a particular portion of the surface 106 that is to be rendered. Traditionally, the light depth value ($Z_{light}$) is gathered from a shadow-map that is generated by rendering during a first pass.

Further calculated is an eye depth value ($Z_{eye}$) that is taken from a perspective of an eye or camera 202 and transformed into the light's perspective. Such eye depth value ($Z_{eye}$) represents a distance between the light source 104 and the portion of the surface 106 that is to be rendered.

As is now readily apparent, when the eye depth value ($Z_{eye}$) is greater than the light depth value ($Z_{light}$), it is assumed that the particular portion of the surface 106 should be rendered with a shadow.

A particular problem arises during the foregoing shadow-mapping procedure due to the fact that the light depth value ($Z_{light}$) and the eye depth value ($Z_{eye}$) are sampled from two different viewpoints, which potentially produce slightly different depth values that may cause incorrect shadow results. Specifically, the light depth value ($Z_{light}$) is obtained from a point in space sampled from the light source viewpoint 104 of the scene 100, while the eye depth value ($Z_{eye}$) is obtained from a close-by point in space sampled from the point of the eye 202, and then transformed into the viewpoint of the light source 104. The two points under comparison are close in space, but still may cause a large enough depth difference with respect to the light source 104, which produces unwanted shadow results.

Prior art FIG. 2A illustrates this shadow-mapping problem. FIG. 2A shows a single ray from the light source hitting a horizontal surface and the corresponding texture element (i.e. texel) in the shadow map contained between point 'a' and 'b'. FIG. 2A also shows three rays (1, 2, and 3) from the eye 202 hitting the same surface 106, which index the single shadow-map texel (all the points inside the [a, b] interval index the same shadow-map texel). Three points on the surface 106 result from the eye viewpoint sampling, and three depth values (Z1, Z2, and Z3) are computed with respect to the light source 104. The comparison of those three depth values with respect to the depth value sampled from the light source point of view illustrates the problem. Clearly, ray number 2 hits the surface exactly at the same point where the light sampled the surface 106 and the comparison of Z2 with respect to the light depth value ($Z_{light}$) produces the correct shadow result. However, rays number 1 and 3 may produce opposite results. Ray number 1 produces a z-value (Z1) which is smaller than the light depth value ($Z_{light}$) and ray number 3 produces another z-value (Z3) greater than the light depth value ($Z_{light}$). The consequence of this difference is that points to the left of the texel center may cause one shadow result, whereas points to the right of the texel center may cause the opposite result, within a given tolerance around the texel center.

In addition to sampling differences between the light and the eye, another problem may also occur. Suppose, in prior art FIG. 2A, that Z2 and the light depth value ($Z_{light}$) were produced using different perspective-interpolation methods (i.e. one with pre-perspective divide and the other with post-perspective divide). In such situation, even though the rays from the light and from the eye sample the exact same point on the surface, the use of different perspective-interpolation methods would cause slightly different depth values, which in turn could cause incorrect shadow results.

Unfortunately, these sampling and interpolation problems result in defects in the shadow-mapping algorithm. In particular, portions of the rendered scene that should be shadowed are not, and vice-versa. A common term for describing such defect is "shadow acne."

Various solutions have been proposed to compensate for such problem. For example, one technique (a.k.a. Woo Shadow Mapping Algorithm) utilizes the conventional shadow-mapping methodology, but with an altered light depth value ($Z_{light}$). In particular, such algorithm utilizes an average light depth value ($Z_{light-AVE}$), which is positioned halfway between the object 102 and the surface 106 that is to be rendered. ($Z_{light-AVE}$) is calculated from a first light depth value ($Z_{light-1}$) and a second light depth value ($Z_{light-2}$). In regions where a single surface is available, the algorithm uses the farthest depth value in the scene (or its average with the single surface available) as the altered depth value.

Prior Art FIG. 3 illustrates the various values 300 utilized to carry out the aforementioned shadow mapping algorithm. Table 1 illustrates the equation that may be used for calculating the average light depth value ($Z_{light-AVE}$).

TABLE 1

$$Z_{light-AVE} = (Z_{light-2} - Z_{light-1})/2$$

While this technique works well in theory, there are many practical complications that preclude the present shadow mapping algorithm from being implemented in a hardware-implemented graphics pipeline. For example, the second light depth value ($Z_{light-2}$) is traditionally not available, or incalculable in a graphics pipeline. Without such second light depth value ($Z_{light-2}$), the present shadow mapping algorithm can not be feasibly implemented in a graphics application specific integrated circuit (ASIC), or graphics accelerator.

DISCLOSURE OF THE INVENTION

A system and method are provided for improved shadow mapping in a graphics pipeline. Raw depth values are initially collected from two depth layers in a scene to be rendered. Shadow-map depth values are then calculated utilizing the raw depth values. The scene is then shadow mapped utilizing the shadow-map depth values in order to improve the appearance of shadows in a rendered scene. The various steps are carried out by a hardware-implemented graphics pipeline, which may include texturing or shadowing mapping hardware.

In use, the raw depth values may be collected during an initial two rendering passes from a light perspective. As an option, the shadow-map depth values may be calculated during the second initial rendering pass, and stored in the form of a shadow map. Thereafter, a third rendering pass from an eye perspective may be used to shadow the scene utilizing the shadow map. In one context, shadow mapping may refer to computing a lighting equation for each fragment by taking into account shadows produced by light sources and objects in a scene.

In one embodiment, the shadow-map depth values may include an average ($Z_{Lave}$) of the raw depth values. Further, a plurality of the shadow-map depth values may be calculated to define a pseudo-surface. As an option, the shadow-map depth values ($Z_{Lave}$) may be calculated utilizing first raw depth values ($Z_{L1}$) of a first depth layer and second raw depth values ($Z_{L2}$) of a second depth layer utilizing the equation: $Z_{Lave}=(Z_{L1}+Z_{L2})/2$.

In another embodiment, the scene, as viewed from an eye perspective, may be shadow-mapped by transforming each of a plurality of eye-perspective fragments into a light perspective, and comparing the depth value thereof with a corresponding shadow-map depth value. Further, each fragment may be shadowed if the associated depth value is greater than the corresponding shadow-map depth value.

In still another embodiment, the collection of the raw depth values from the depth layers may be done so in multiple rendering passes. In particular, first raw depth values relating to the first depth layer may be collected during a first rendering pass. As an option, the first raw depth values relating to the first depth layer may take the form of a shadow-map to be used by subsequent rendering passes.

In a similar manner, additional raw depth values relating to the at least one additional depth layer may be collected during at least one additional rendering pass. The at least one additional rendering pass may be taken from an eye position from which a previous rendering pass is taken.

In still another embodiment, the additional raw depth values relating to the at least one additional depth layer may be collected by removing a portion of the scene associated with a previous depth layer. In particular, this may be accomplished by performing a test. In an embodiment where the test works from a front of the scene to a back of the scene, the test determines whether the portion of the scene associated with the previous depth layer is in front of the at least one additional depth layer. If it is determined that the portion of the scene associated with the previous depth layer is in front of the at least one additional depth layer, the particular portion of the scene may be removed. Of course, the test may also work from a front of the scene to a back of the scene.

In one aspect of the present embodiment, the test may calculate differences between z-values relating to the previous depth layers and a z-value relating to the at least one additional depth layer. In operation, a particular portion of the scene may be removed based on a test calculated involving the z-values relating to the previous depth layers and the z-value relating to the at least one additional depth layer.

As an option, the z-values relating to the previous depth layers may be computed using the same hardware method that produces the z-values corresponding to the at least one additional depth layer, which improves accuracy of the tests.

These and other advantages of the present invention will become apparent upon reading the following detailed description and studying the various figures of the drawings.

BRIEF DESCRIPTION OF THE DRAWINGS

The foregoing and other aspects and advantages are better understood from the following detailed description of a preferred embodiment of the invention with reference to the drawings, in which.

Prior Art

Prior Art

Prior art

Prior Art

DESCRIPTION OF THE PREFERRED EMBODIMENTS

Figure 1:
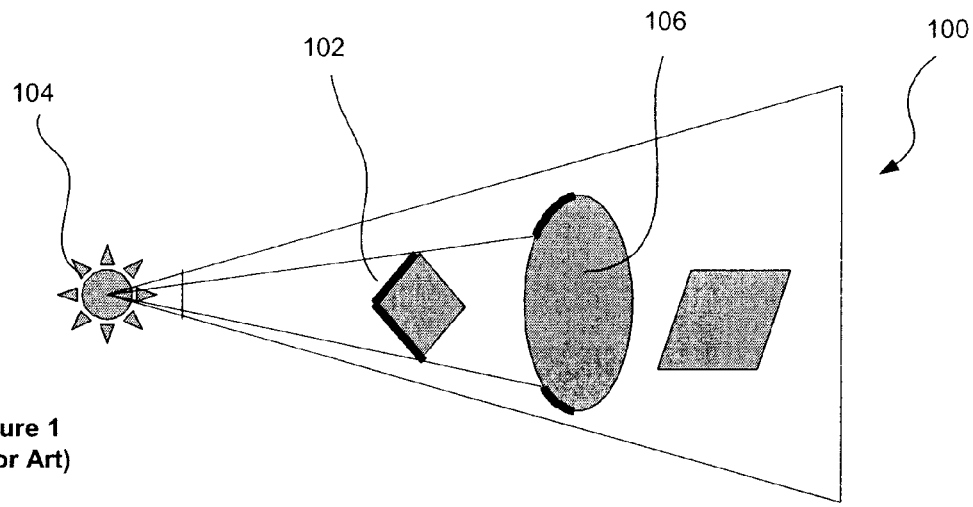
FIG. 1 illustrates a scene to be rendered to include shadows.
Figure 2:
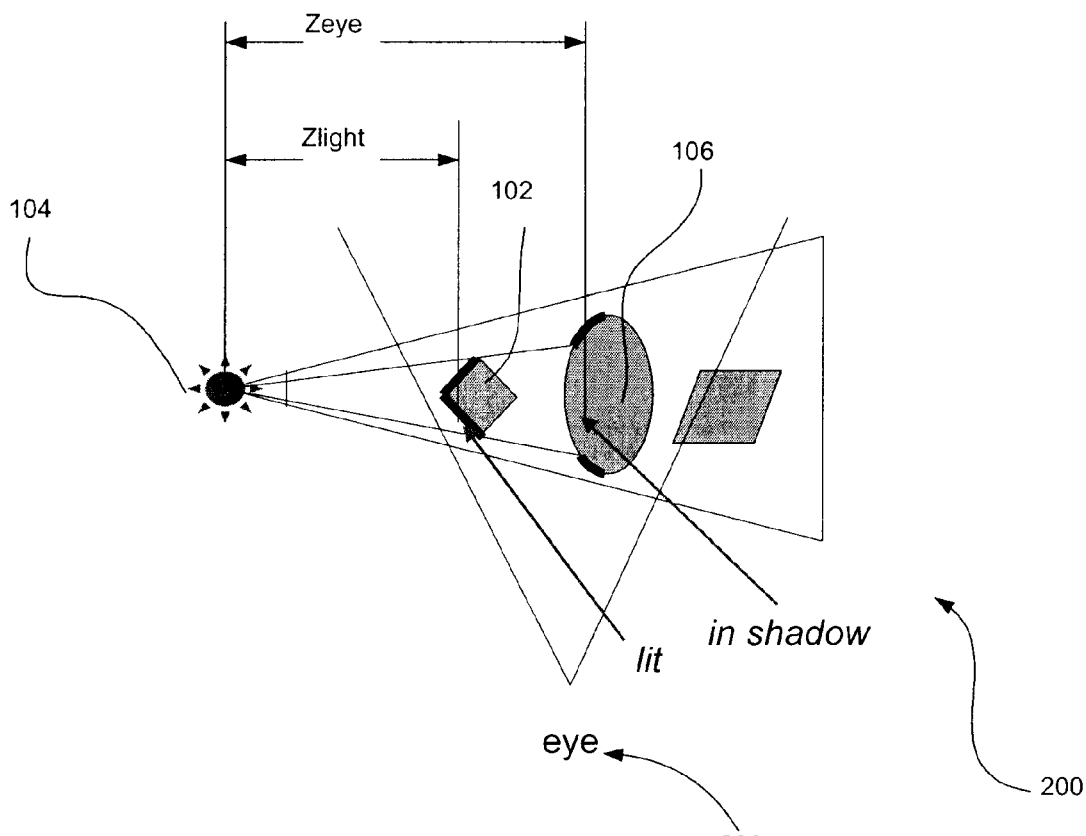
FIG. 2 illustrates a prior art technique of shadow mapping.
Figure 2A:
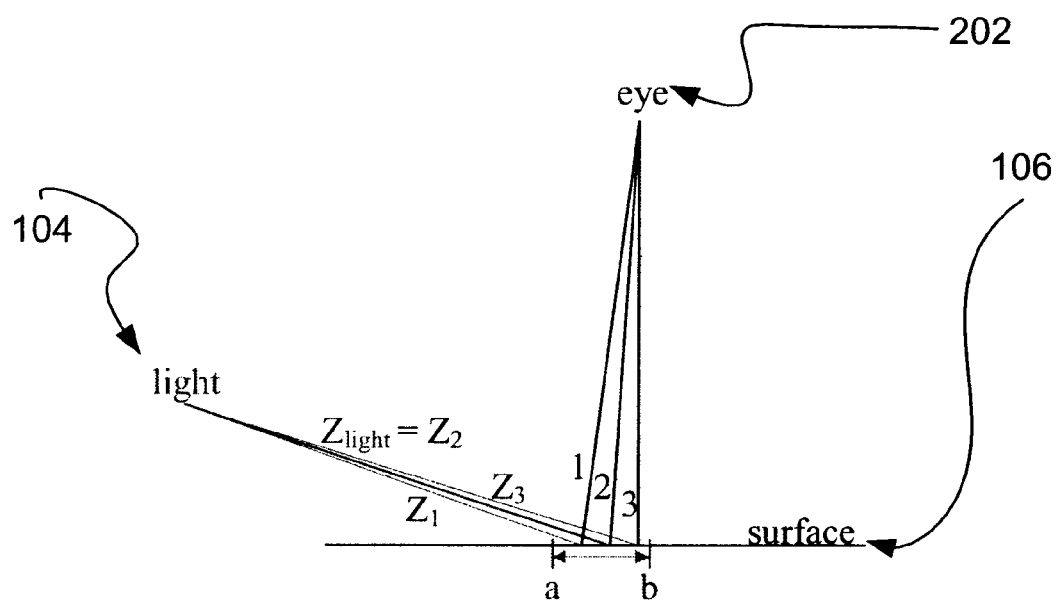
FIG. 2A illustrates a conventional shadow-mapping problem.
Figure 3:
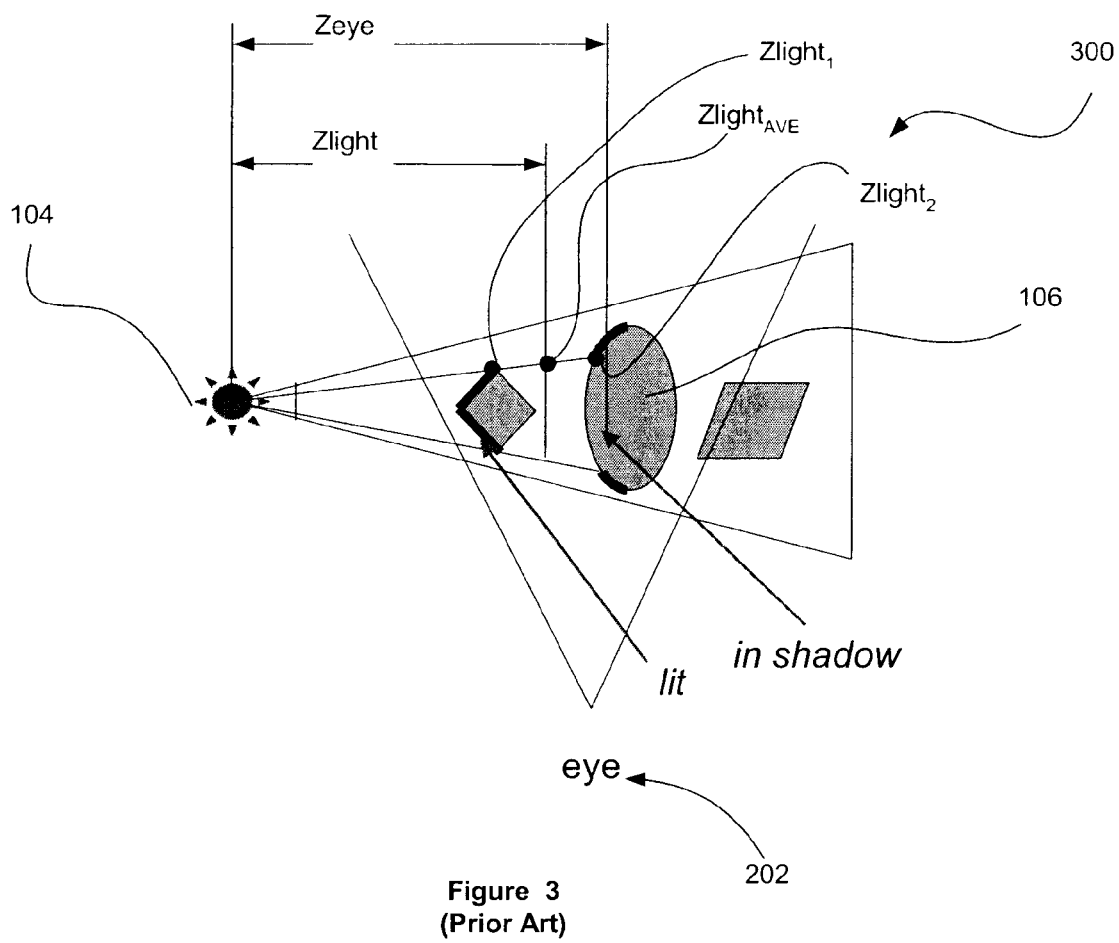
FIG. 3 illustrates the various values utilized to carry out a prior art shadow mapping algorithm.
Figure 4:
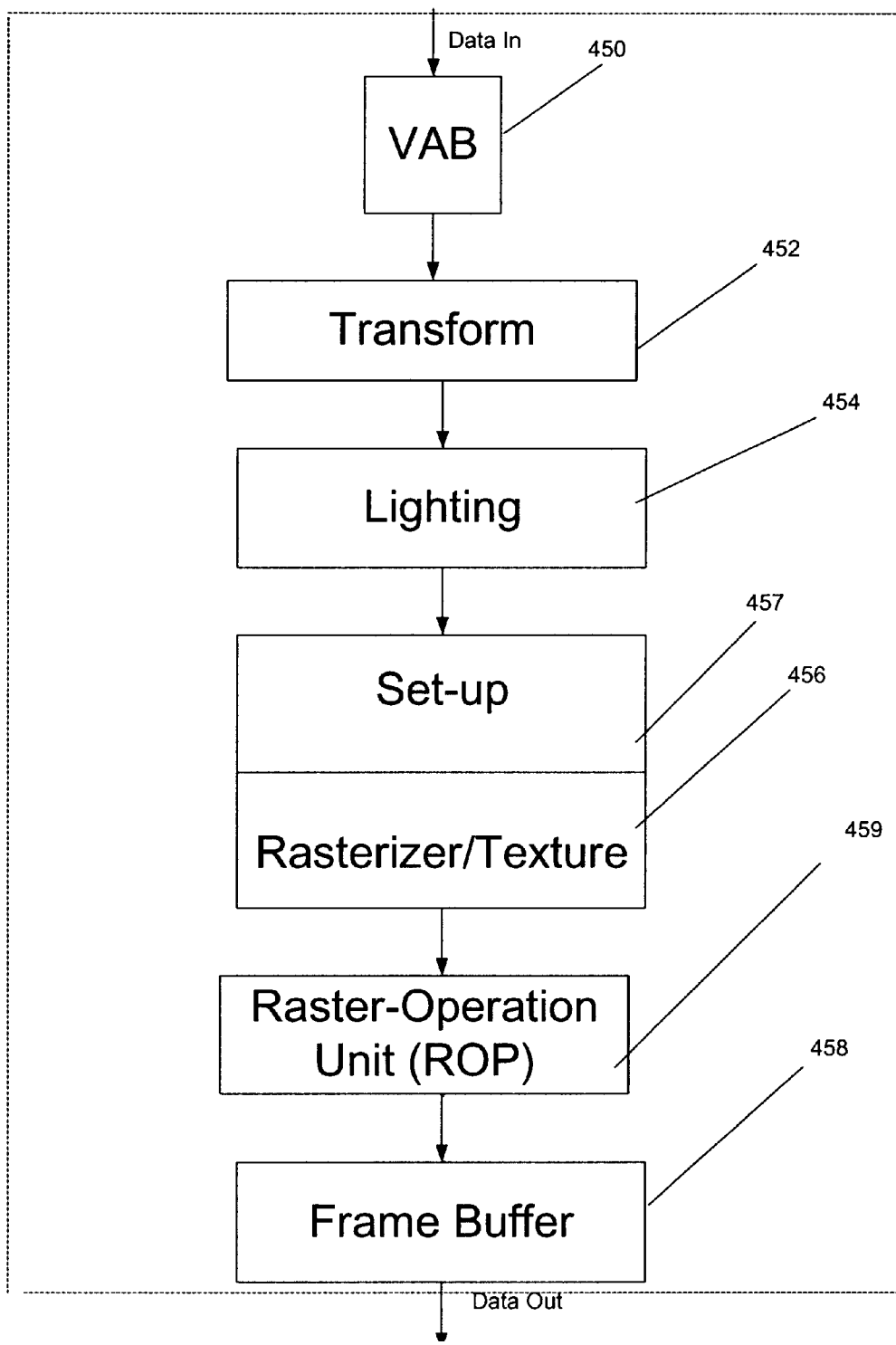
FIG. 4 is a system diagram illustrating the various components of one embodiment of the present invention.

FIGS. 1–3 illustrate the prior art. FIG. 4 is a system diagram illustrating the various components of one embodiment of the present invention. As shown, the present embodiment may be divided into a plurality of modules including a vertex attribute buffer (VAB) 450, a transform module 452, a lighting module 454, a rasterization/texturing module 456 with a set-up module 457, a raster-operation module (ROP) 459, and a frame buffer 458.

In one embodiment, each of the foregoing modules may be situated on a single semiconductor platform. In the present description, the single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional CPU and bus implementation. Of course, the various modules may also be situated separately or in various combinations of semiconductor platforms per the desires of the user.

During operation, the VAB 450 is included for gathering and maintaining a plurality of vertex attribute states such as position, normal, colors, texture coordinates, etc. Completed vertices are processed by the transform module 452 and then sent to the lighting module 454. The transform module 452 generates vectors for the lighting module 454 to light.

The output of the lighting module 454 is screen-space data suitable for the set-up module 457, which, in turn, sets up primitives. Thereafter, rasterization/texturing module 456 carries out rasterization and texturing of the primitives. The rasterization/texturing module 456 may be equipped with shadow-mapping hardware for carrying out shadow mapping. Shadow mapping is a well-known technique for depicting objects of a scene with shadows, where the per-fragment shadow-mapping results may be encoded in the color and alpha channels.

Output of the rasterization/texturing module 456 is then sent to the raster-operation module 459 for performing alpha and z buffering tests. It should be noted that the alpha-test component of the hardware might be used to discard fragments/pixels that fail a depth-test performed during shadow mapping.

The output of the raster-operation module 459 is then sent to a frame buffer 458 for storage prior to being output to a display device (not shown).

Figure 5:
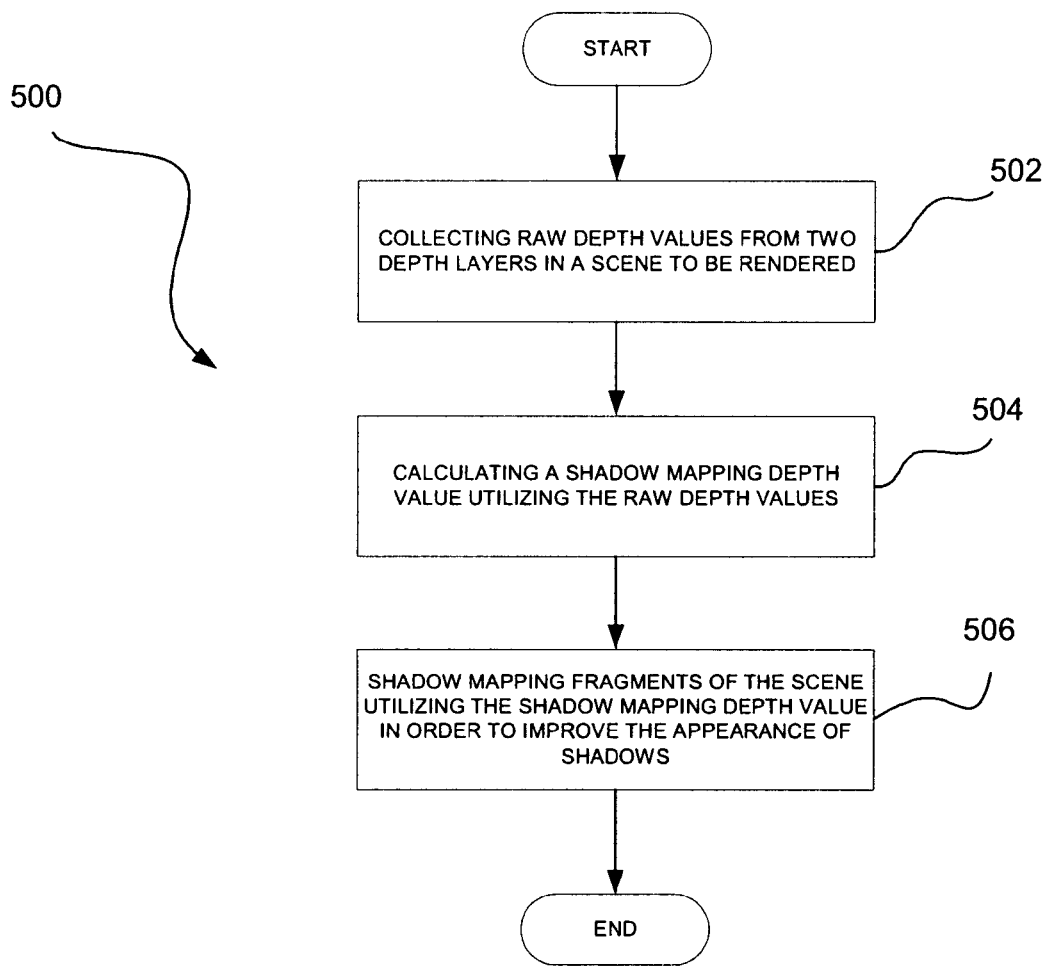
FIG. 5 illustrates a method for shadow mapping in a graphics pipeline, in accordance with one embodiment.

FIG. 5 illustrates a method 500 for shadow mapping in a graphics pipeline, in accordance with one embodiment. While the present method 500 is described in the context of the graphics pipeline shown in FIG. 4, it should be noted that the principles set forth herein may be implemented in any desired architecture.

In operation 502, raw depth values are initially collected from two depth layers in a scene to be rendered. In one embodiment, such depth values may include z-values. Moreover, the various depth layers may each include a portion of the scene (i.e. pixel referring to objects, polygons, primitives, etc.) that resides at a predetermined depth level in the scene. In the context of the present description, the term "depth" may refer to a distance or vector length along any axis (i.e. z-axis) in a scene. It should be noted that this collection of depth values may be collected in any desired manner. One exemplary technique will be set forth in greater detail during reference to FIG. 7.

Shadow-map depth values are then calculated in operation 504 utilizing the raw depth values. As an option, a plurality of the shadow-map depth values may be calculated to define a pseudo-surface. In one embodiment, the shadow-map depth values may include an average of the raw depth values. In particular, average shadow-map depth values ($Z_{Lave}$) may be calculated utilizing first raw depth values ($Z_{L1}$) of a first depth layer and second raw depth values ($Z_{L2}$) of a second depth layer utilizing the equation: $Z_{Lave}=(Z_{L1}+Z_{L2})/2$.

Next, in operation 506, fragments of the scene are then shadow-mapped utilizing the shadow-map depth value in order to improve the appearance of shadows in the rendered scene. While the shadow mapping may be carried out in any desired manner, one exemplary specific method will be set forth during reference to FIG. 6.

Figure 6:
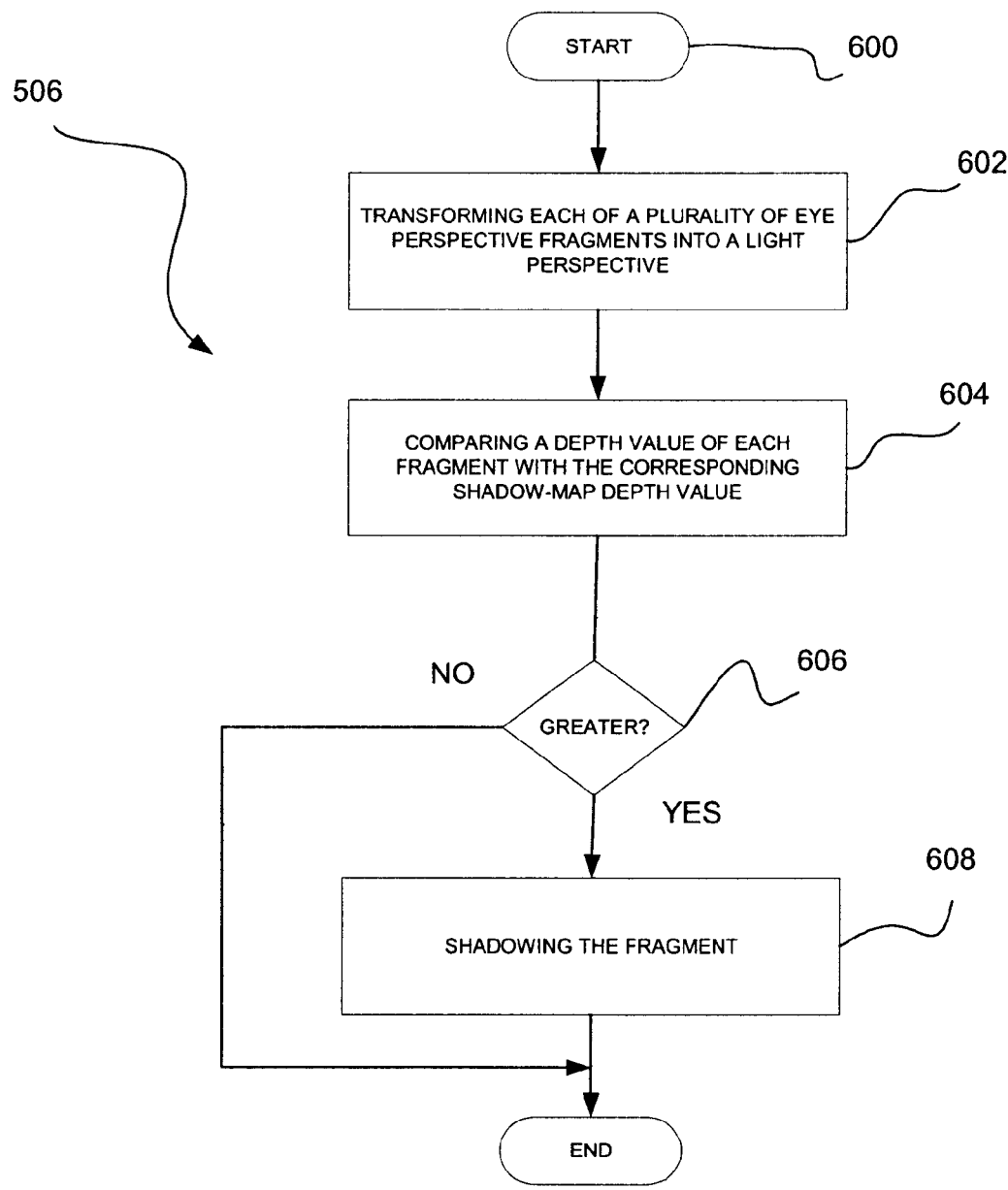
FIG. 6 illustrates an exemplary specific method of shadow mapping, in accordance with the method of FIG. 5.

FIG. 6 illustrates an exemplary method 600 for shadow mapping, in accordance with operation 506 of FIG. 5. The present shadow-mapping method 600 may take any form other than that disclosed herein. For more information regarding shadow-mapping, reference may be made to a patent entitled "SYSTEM, METHOD AND ARTICLE OF MANUFACTURE FOR SHADOW-MAPPING" which was filed Dec. 5, 2000 under Ser. No. 09/730,639, and which is incorporated herein by reference.

In the context of the exemplary method 600, each eye perspective fragment is initially transformed into a light perspective. Note operation 602. This may be accomplished by any well-known technique. Next, in operation 604, a depth value of each fragment is compared with a corresponding shadow-map depth value.

Subsequently, the fragment may be shadowed if the associated depth value is greater than the corresponding shadow-map depth value. Note decision 606 and operation 608. As an option, various other operations (i.e. <, =, <=, =>, !=, etc.) may be used during the course of the aforementioned comparison in order to afford similar results.

Figure 7:
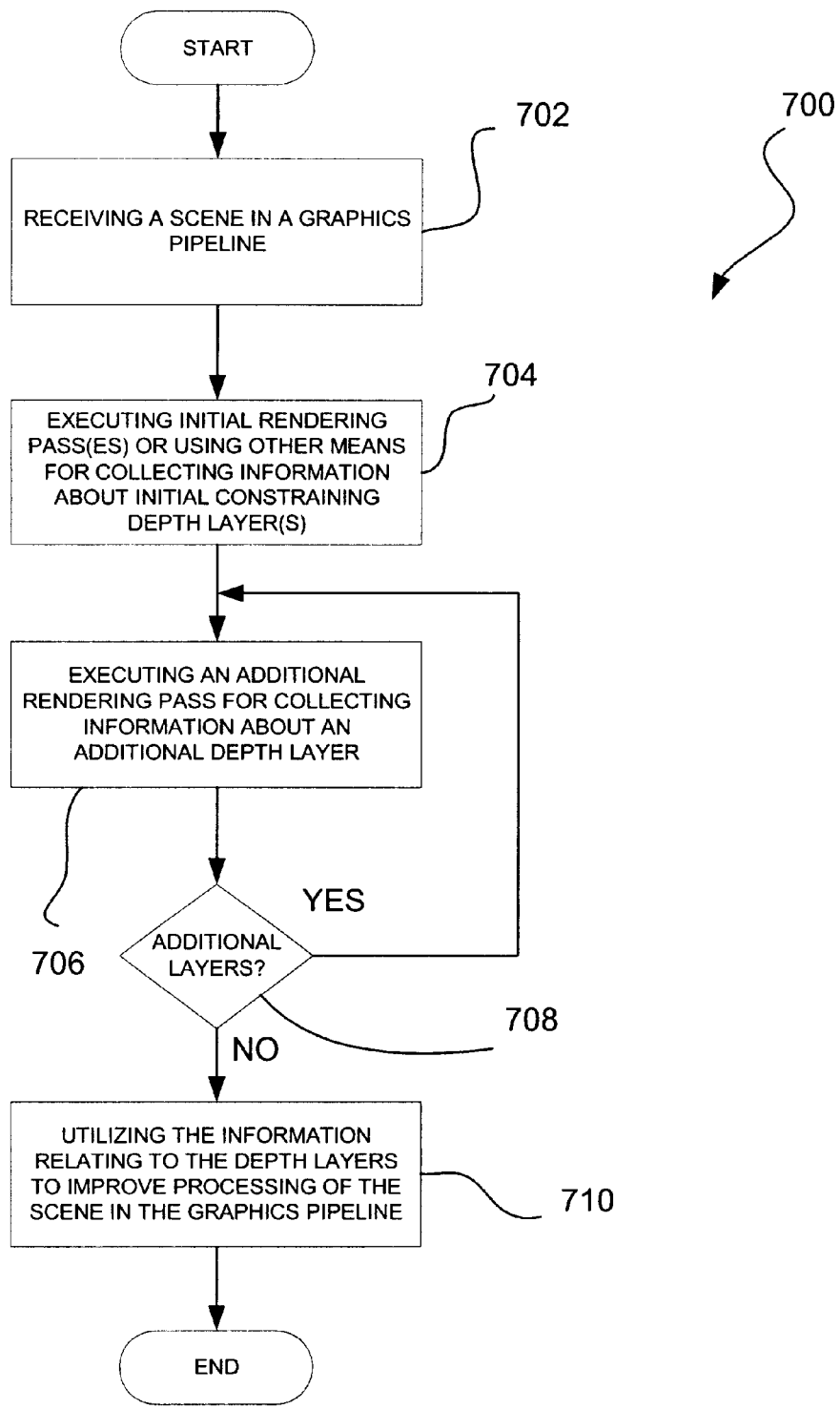
FIG. 7 illustrates a process for collecting and using information in a graphics pipeline such as that shown in FIG. 4, in accordance with the method of FIG. 5.

FIG. 7 illustrates a method 700 for collecting and using information in a graphics pipeline such as that shown in FIG. 4, in accordance with operation 502 of FIG. 5. While the present method 700 is described in the context of the graphics pipeline shown in FIG. 4, it should be noted that the principles set forth herein may be implemented in any desired architecture.

Initially, in operation 702, a scene is received in the graphics pipeline. In the context of the present description, a scene may refer to any particular set of objects, polygons, primitives, etc. that are to be rendered. In particular, the scene is received in the rasterizer/texture module 456 of the pipeline of FIG. 4.

Next, in operation 704, initial rendering passes may be executed or user-created buffer received for collecting information about initial depth layers. It should be noted that the initial depth layers may be collected in any desired manner. In use, the initial depth layers may be used as constraining depth layers which inherently define a plurality of depth constraints. The manner in which such initial depth layers operate as constraining depth layers will be set forth hereinafter in greater detail.

In the context of the present description, each rendering pass refers to any separate set of processes carried out by the rasterizer/texture module 456. More information regarding the initial rendering passes in operation 704 will be set forth in greater detail during reference to FIG. 8.

The information that is collected in operation 704 may include the aforementioned raw depth values (i.e. z-values). Moreover, similar to each of the depth layers set forth in the present description, the constraining depth layers may include a portion of the scene (i.e. pixels corresponding to objects, polygons, primitives, etc.) that resides at predetermined depth levels in the scene. In the context of the present description, the term "depth" may refer to a distance or vector length between an eye/camera location and the corresponding fragment coordinates in a scene.

Thereafter, in operation 706, at least one additional rendering pass is executed for collecting information about additional depth layers. As indicated by decision 708, the operation 706 is repeated for each additional depth layer desired. For reasons that will soon become apparent, the results of the rendering passes of operations 704 and 706 may be stored in memory such as a texture member associated with the graphics pipeline.

It should be noted that a plurality of depth tests may be performed on the results from each additional rendering pass as well as on other depth layers. Utilizing such multiple depth tests and multiple depth layers, information may be collected from a desired depth layer. More information regarding the at least one additional rendering pass and the associated multiple depth tests in operation 706 will be set forth in greater detail during reference to FIG. 9.

Once it is determined in decision 708 that no additional depth layers are desired, the information relating to each of the depth layers may be utilized to improve processing of the scene in the graphics pipeline. See operation 710. In particular, the information may be used to improve the realism resulting from the rendering process in the graphics pipeline.

Figure 8:
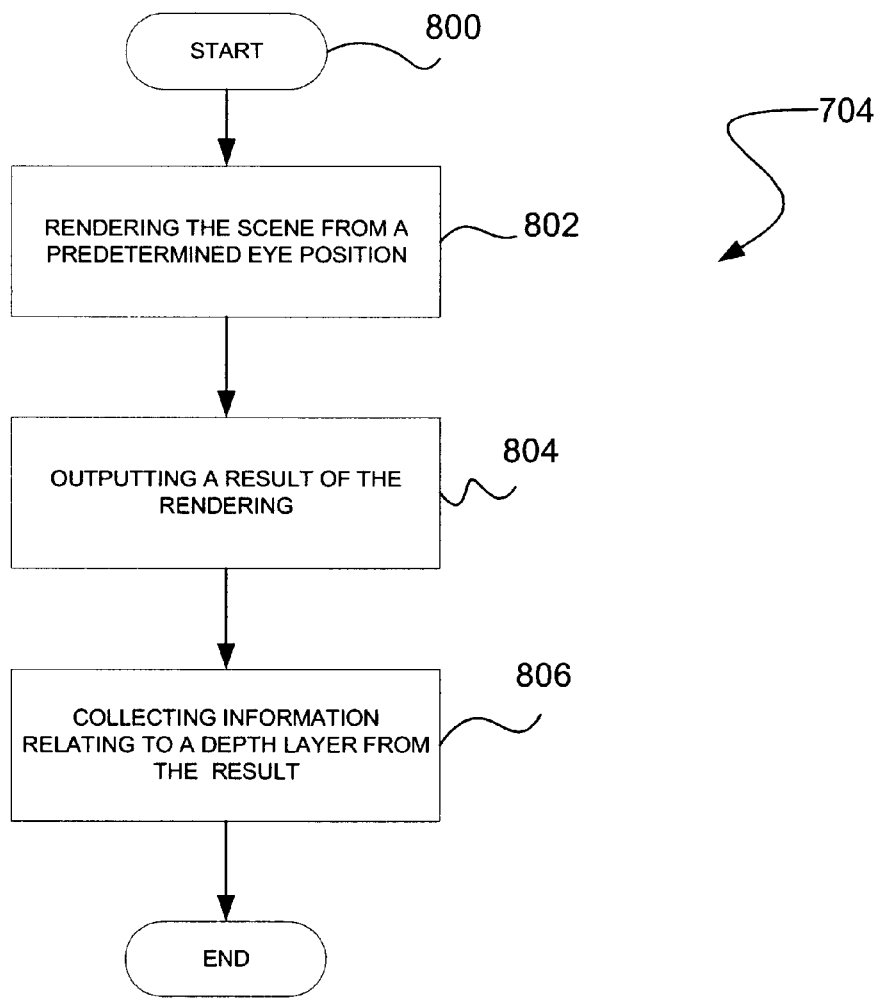
FIG. 8 illustrates a method associated with the initial rendering pass(es) of the process of FIG. 7.

FIG. 8 illustrates a method 800 associated with the initial rendering passes, in accordance with operation 704 of FIG. 7. As shown, the scene is initially rendered from a predetermined eye position in a manner that is well known in the art. See operation 802.

A result of the operation 802 is then outputted in operation 804. It should be noted that the result of operation 802 may take any form that includes at least a portion of a rendered scene from which the information (i.e. data, parameters, attributes, etc.) relating to the constraining depth layers may be collected. Note operation 806.

Figure 9:
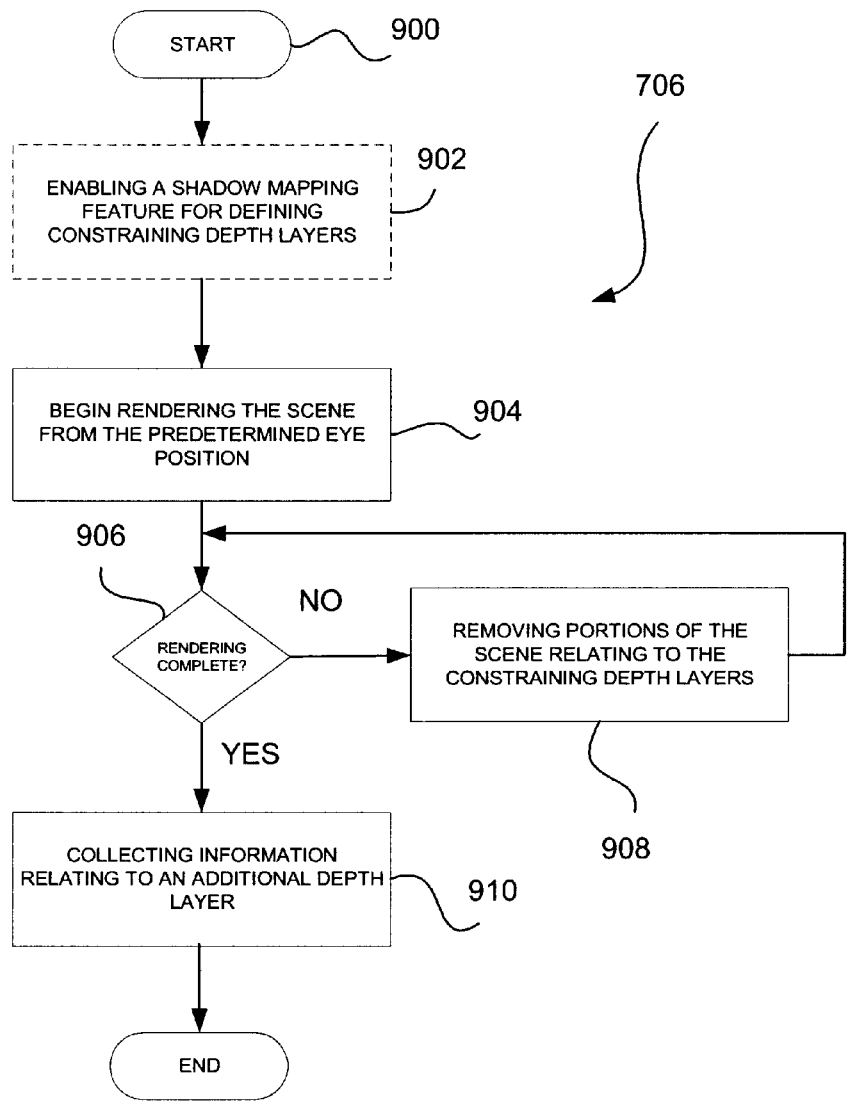
FIG. 9 illustrates a method for executing one pass of the at least one additional rendering pass of the process of FIG. 7.

FIG. 9 illustrates a method 900 for executing the at least one additional rendering pass, in accordance with operation 706 of FIG. 7. A shadow-mapping feature is enabled during the at least one additional rendering pass in operation 902. Then, in operation 904, the scene is rendered utilizing the rasterizer/texture module 456 of the graphics pipeline. For reasons that will soon become apparent, it is important that the scene be rendered from the predetermined eye position associated with the first rendering pass of operation 704 of FIG. 7.

The pendency of operation 904 is monitored in decision 906. While the at least one additional rendering pass is taking place, portions of the scene relating to the constraining depth layers may be removed in operation 908. In one embodiment, a particular set of tests may be employed to facilitate such removal. It should be noted that such tests may involve as many depth layers/constraints as necessary during each rendering pass in order to collect the desired information. More information on this test will be set forth in greater detail during reference to FIG. 10.

The purpose of operation 908 is to remove any objects, polygons, primitives, etc. or portions (in the form of fragments) thereof related to any constraining depth layers that may be obstructing the at least one additional depth layer that is currently being rendered. By removing such portions of the scene, a result of the rendering pass may be effectively used to extract the information relating to the desired depth layer. Such removal process may be referred to as "depth peeling" or "Z-peeling" due to the manner in which it "peels" each of the portions of the scene relating to the constraining depth layer(s).

Once it is determined that the at least one additional rendering pass is complete in decision 906, the information is collected from the results. See operation 910. Of course, such method 900 may be repeated as many times is needed to collect information from any desired number of depth layers.

Figure 10:
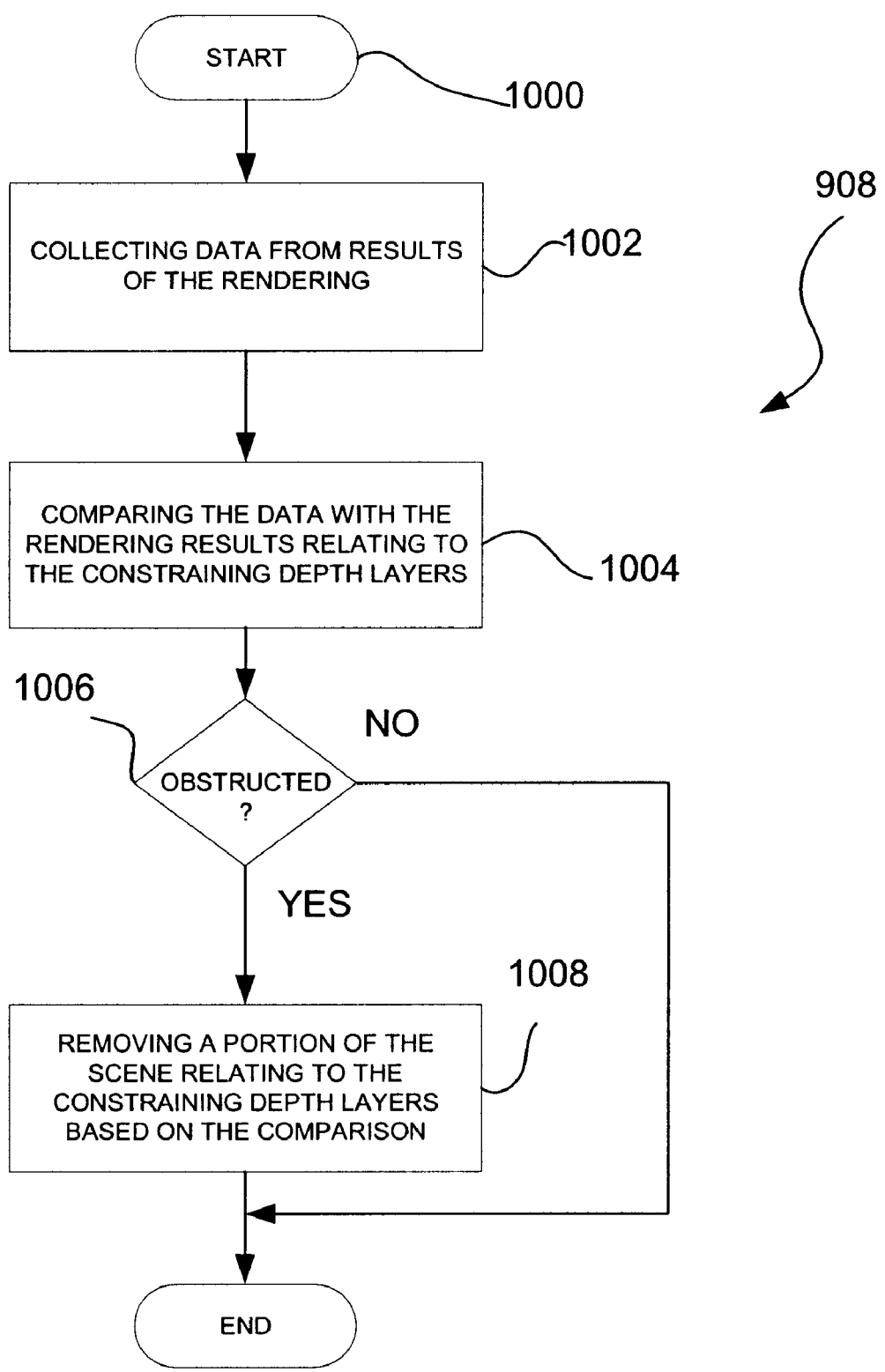
FIG. 10 illustrates a method of conducting a test to remove portions of a scene by "depth peeling" during one of the at least one additional rendering passes of FIG. 9.

FIG. 10 illustrates a method 1000 of conducting a test for use during removal of portions of a scene during "depth peeling", in accordance with operation 908 of FIG. 9. While the at least one additional rendering pass is occurring, preliminary data from results of the rendering are collected in operation 1002. Such data are compared with the rendering results associated with the constraining depth layers. See operations 1004 and 1006. More information on the particular values associated with the data of operation 1002 and the rendering results of operation 1004 will be set forth during reference to FIG. 11.

Figure 11:
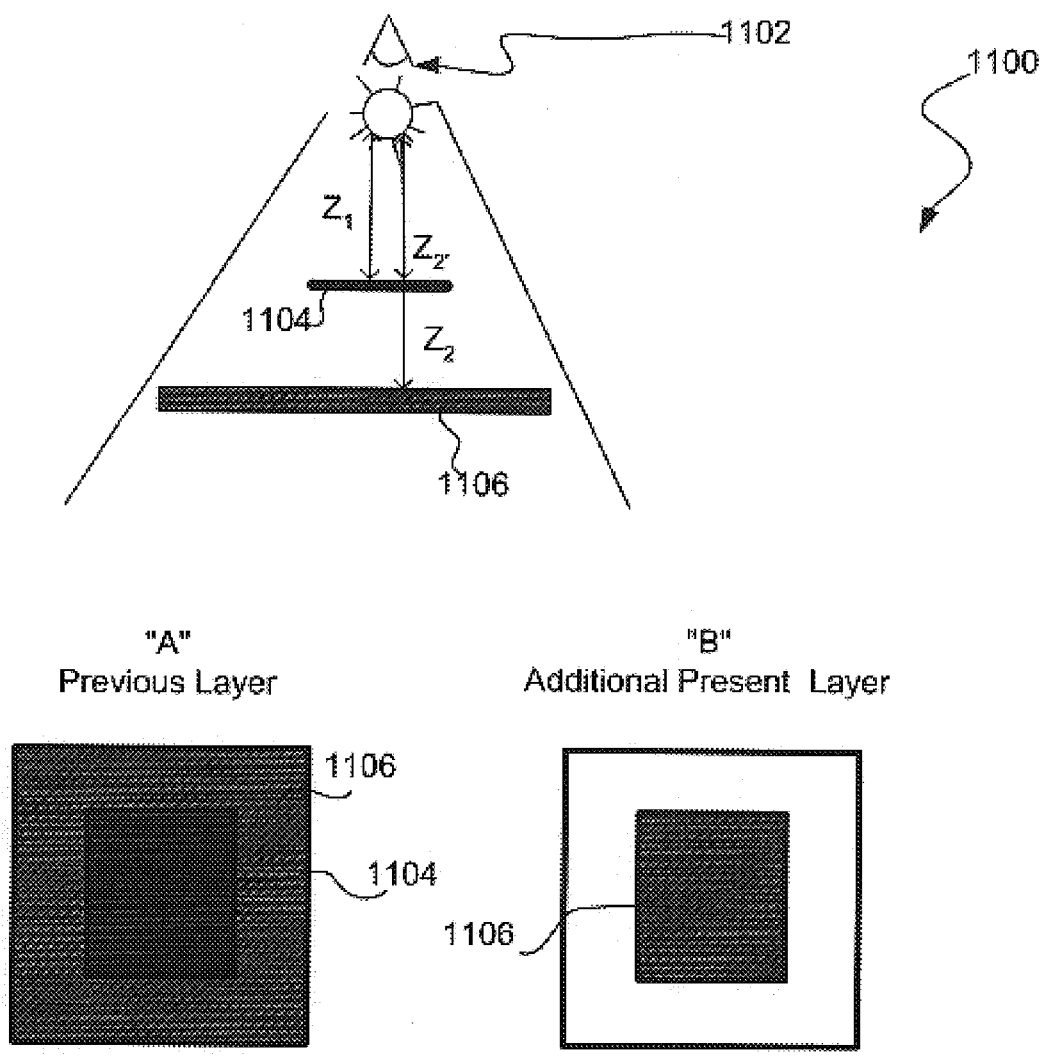
FIG. 11 illustrates the various parameters involved during the test of FIG. 10.

FIG. 11 illustrates the various parameters involved during the test of FIG. 10. As shown, a scene 1100 is being rendered during the at least one additional pass from the predetermined eye position associated with the previous rendering pass. Note eye position 1102. It should be noted that the example of FIG. 11 does not take into account the possibility of the existence of multiple previous layers for simplicity purposes.

In accordance with operation 1002 of FIG. 10, a constraining z-value ($Z_1$) relating to a portion 1104 of the scene 1100 associated with the constraining depth layer is collected. Further, in accordance with operation 1004 of FIG. 10, a second z-value ($Z_2$) relating to a portion 1106 of the scene 1100 associated with the at least one additional depth layer is collected. The "peeling" process most prevalently happens at the fragment level, so the portions 1104 and 1106 are generally partial polygons.

It should be noted that the second z-value ($Z_2$) may be greater than or equal to first z-value ($Z_1$) depending on whether a portion 1104 of the scene 1100 associated with the previous depth layer is in front of the portion 1106 of the scene 1100 associated with the at least one additional depth layer. Note the second z-value ($Z_2$) and the second z-value prime ($Z_{2'}$), respectively.

In other words, during operation 1004 of FIG. 10, difference values are calculated between constraining z-values ($Z_1$) relating to the constraining depth layers and z-values ($Z_2$) relating to the at least one additional depth layer. Upon no difference being calculated between the constraining z-values ($Z_1$) relating to the constraining depth layers and the z-values ($Z_2$) relating to the at least one additional depth layer (when the second z-value is $Z_{2'}$), it may be assumed that the portion 1104 of the scene 1100 associated with the constraining depth layers obstruct the portion 1106 of the scene 1100 associated with the at least one additional depth layer. See decision 1006 of FIG. 10. In such case, the portion 1104 of the scene 1100 associated with the constraining depth layers is removed before the results of the rendering are written to the frame buffer. Note the transition from "A", where the portion 1104 exists, to "B", where the portion 1104 is "peeled", to expose the portion 1106 of the scene 1100 associated with the at least one additional depth layer.

In the foregoing embodiment, the tests work from a front of the scene 1100 to a back of the scene 1100. Of course, the tests may also work from a back of the scene 1100 to a front of the scene 1100. Such back-to-front embodiment may be implemented by changing the decision 1006 of FIG. 10. As an option, various other operations (i.e. <, =, <=, =>, !=, etc.) may be used during the course of the aforementioned tests.

It is thus now readily apparent that, by the nature of these tests, it is important that the additional rendering pass be taken from the predetermined eye position associated with the previous rendering passes, since, for the peeling tests to be meaningful, the fragment coordinates compared by the tests must belong to the exact same point in space. That is, the multiple rendering passes must match up exactly at fragment coordinates, which implies rendering the scene from the same eye position.

Similarly, it is also readily apparent that, by the same nature of the tests, it is important that all the rendering passes use the exact same method for producing depth values, since a slight difference in depth values for otherwise matching fragments might cause incorrect results for the depth tests. Variance in depth values may arise due to using different methods for producing such coordinates.

The present tests thus output the nearest, second nearest, etc. fragments at each pixel. The present technique may take n passes over a scene in order to get n layers deep into the scene.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for shadow-mapping in a graphics pipeline, comprising:
   (a) collecting raw depth values from two depth layers in a scene to be rendered;
   (b) calculating a shadow-map depth value utilizing the raw depth values; and
   (c) shadow-mapping the scene utilizing the shadow-map depth value in order to improve the appearance of shadows in the rendered scene;
   (d) wherein (a)–(c) are carried out by a hardware-implemented graphics pipeline;
   (e) wherein the raw depth values are each collected during different passes.

2. The method as recited in claim 1, wherein the shadow-map depth value includes an average of the raw depth values.

3. The method as recited in claim 1, wherein a plurality of the shadow-map depth values is calculated to define a pseudo-surface.

4. The method as recited in claim 1, wherein the shadow-map depth value ($Z_{Lave}$) is calculated utilizing a first raw depth value of a first depth layer ($Z_{L1}$) and a second raw depth value of a second depth layer ($Z_{L2}$) utilizing the equation: $Z_{Lave} = (Z_{L1} + Z_{L2})/2$.

5. The method as recited in claim 1, wherein the scene, as viewed from an eye perspective, is shadow-mapped by transforming each of a plurality of eye perspective fragments into a light perspective and comparing the depth value thereof with a corresponding shadow-map depth value.

6. The method as recited in claim 5, wherein each fragment is shadowed based on the comparison.

7. The method as recited in claim 1, wherein the (a)–(c) are carried out by texture mapping hardware.

8. The method as recited in claim 1, wherein the (a)–(c) are carried out by shadow-mapping-related hardware.

9. The method as recited in claim 1, wherein raw depth values include z-values.

10. The method as recited in claim 1, wherein the depth peeling includes executing a first rendering pass for collecting a first raw depth value relating to a first depth layer, and executing a second rendering pass for collecting a second raw depth value relating to a second depth layer.

11. The method as recited in claim 1, wherein the raw depth values include z-values collected utilizing depth peeling including executing a first rendering pass for generating a shadow-map from which a first z-value value relating to a first depth layer is collected, and executing a second rendering pass with a shadow-mapping feature enabled and from an eye position from which the first rendering pass is taken for collecting a second z-value relating to a second depth layer.

12. The method as recited in claim 11, wherein the second z-value relating to the second depth layer is collected by removing a portion of the scene associated with the first depth layer.

13. The method as recited in claim 12, wherein the second z-value relating to the second depth layer is collected by performing a test to determine which portion of the scene to remove.

14. The method as recited in claim 13, wherein the test determines whether the portion of the scene is in front of the second depth layer.

15. The method as recited in claim 14, wherein the portion of the scene is removed upon the test determining that the portion of the scene is in front of the second depth layer.

16. The method as recited in claim 15, wherein the test calculates a difference between the first z-value relating to the first depth layer and the second z-value relating to the second depth layer.

17. The method as recited in claim 16, wherein each portion of the scene is removed upon no difference being calculated between the associated first z-value relating to the first depth layer and the associated second z-value relating to the second depth layer.

18. The method as recited in claim 17, wherein the z-values relating to the depth layers are generated using a single perspective-interpolation method.

19. A computer program product for shadow-mapping in a graphics pipeline, comprising:
   (a) computer code for collecting raw depth values from two depth layers in a scene to be rendered;
   (b) computer code for calculating a shadow-map depth value utilizing the raw depth values; and
   (c) computer code for shadow-mapping the scene utilizing the shadow-map depth value in order to improve the appearance of shadows in the rendered scene;
   (d) wherein computer code segments (a)–(c) are carried out by a hardware-implemented graphics pipeline;
   (e) wherein the raw depth values are each collected during different passes.

20. A system for shadow-mapping in a graphics pipeline, comprising:
   (a) logic for collecting raw depth values from two depth layers in a scene to be rendered;
   (b) logic for calculating a shadow-map depth value utilizing the raw depth values; and (c) logic for shadow-mapping the scene utilizing the shadow-map depth value in order to improve the appearance of shadows in the rendered scene;

(d) wherein logic segments (a)–(c) are carried out by a hardware-implemented graphics pipeline;

(e) wherein the raw depth values are each collected during different passes.

21. A method for shadow-mapping in a graphics pipeline, comprising:

(a) collecting raw depth values from two depth layers in a scene to be rendered;

(b) calculating a shadow-map depth value ($Z_{Lave}$) utilizing the raw depth values, wherein the shadow-map depth value ($Z_{Lave}$) is calculated utilizing a first raw depth value ($Z_{L1}$) of a first depth layer and a second raw depth value ($Z_{L2}$) of a second depth layer utilizing the equation: $Z_{Lave}=(Z_{L1}+Z_{L2})/2$; and (c) shadow-mapping the scene utilizing the shadow-map depth value ($Z_{Lave}$) in order to improve the appearance of shadows in the rendered scene by:
 (i) transforming each of a plurality of eye perspective fragments into a light perspective,
 (ii) comparing a depth value of each fragment with the corresponding shadow-map depth value ($Z_{Lave}$),
 (iii) determining whether the depth value of each fragment is greater than the corresponding shadow-map depth value ($Z_{Lave}$), and
 (iv) shadowing the fragment if is determined that the depth value thereof is greater than the corresponding shadow-map depth value ($Z_{Lave}$);

(d) wherein (a)–(c) are carried out by a hardware-implemented graphics pipeline;

(e) wherein the raw depth values are each collected during different passes.

22. A method for shadow-mapping in a graphics pipeline, comprising:

(a) collecting raw depth values from two depth layers in a scene to be rendered by:
 (i) executing a first rendering pass for generating a shadow-map from which a first raw depth value relating to a first depth layer is collected, and
 (ii) executing a second rendering pass with a shadow-mapping feature and an alpha-test enabled and from an eye position from which the first rendering pass is taken for collecting a second z-value relating to a second depth layer;

(b) calculating a shadow-map depth value utilizing the raw depth values; and (c) shadow-mapping the scene during a third rendering pass utilizing the shadow-map depth value in order to improve the appearance of shadows in the rendered scene.

* * * * *